US009432136B2

(12) United States Patent
Kim et al.

(10) Patent No.: US 9,432,136 B2
(45) Date of Patent: Aug. 30, 2016

(54) METHOD FOR SUPPORTING A DYNAMIC-TIME DIVISION DUPLEX (D-TDD) DOWNLINK-UPLINK CONFIGURATION IN A WIRELESS COMMUNICATION SYSTEM, AND APPARATUS THEREFOR

(75) Inventors: Dongcheol Kim, Anyang-si (KR); Hangyu Cho, Anyang-si (KR); Kyujin Park, Anyang-si (KR); Dongguk Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 14/002,512

(22) PCT Filed: Mar. 2, 2012

(86) PCT No.: PCT/KR2012/001577
§ 371 (c)(1),
(2), (4) Date: Aug. 30, 2013

(87) PCT Pub. No.: WO2012/118345
PCT Pub. Date: Sep. 7, 2012

(65) Prior Publication Data
US 2014/0036738 A1 Feb. 6, 2014

Related U.S. Application Data

(60) Provisional application No. 61/448,144, filed on Mar. 1, 2011.

(51) Int. Cl.
*H04W 4/00* (2009.01)
*H04J 3/16* (2006.01)
*H04B 7/26* (2006.01)
*H04W 72/12* (2009.01)
*H04L 5/14* (2006.01)

(52) U.S. Cl.
CPC ............ *H04J 3/1694* (2013.01); *H04B 7/2643* (2013.01); *H04L 5/14* (2013.01); *H04W 72/1263* (2013.01)

(58) Field of Classification Search
None
See application file for complete search history.

(56) References Cited

U.S. PATENT DOCUMENTS

| 2006/0099987 A1* | 5/2006 | Singh | ................... H04W 24/02 455/550.1 |
| 2009/0249153 A1 | 10/2009 | Zhang | |
| 2013/0077606 A1* | 3/2013 | Wu | ...................... H04B 7/2656 370/336 |

FOREIGN PATENT DOCUMENTS

| KR | 10-2008-0045330 A | 5/2008 |
| KR | 10-2008-0070437 A | 7/2008 |
| KR | 10-2010-0139062 A | 12/2010 |
| WO | WO 2010/061053 A1 | 6/2010 |

OTHER PUBLICATIONS

Nokia et al., "Considerations on TDD Relay", 3GPP TSG RAN WG1 Meeting #56, R1-090734, Athens, Greece, Feb. 9-13, 2009, 2 pages, XP50318598.

\* cited by examiner

*Primary Examiner* — Kevin C Harper
(74) *Attorney, Agent, or Firm* — Birch, Stewart, Kolasch & Birch, LLP

(57) ABSTRACT

Disclosed is a method for supporting a dynamic-time division duplex (D-TDD) downlink-uplink configuration in a wireless communication system and to an apparatus therefor. A method in which a first network node supports a dynamic-time division duplex (D-TDD) downlink-uplink configuration according to one embodiment of the present invention comprises a step of selecting two or more TDD downlink-uplink configurations from among a plurality of predefined TDD downlink-uplink configurations based on a predetermined rule so as to establish a set of TDD downlink-uplink configurations, wherein the predetermined rule may enable the selection of two or more TDD downlink-uplink configurations from a number of downlink subframe durations constituted by subframes other than a downlink subframe, or from a number of uplink subframe durations constituted by subframes other than an uplink subframe.

11 Claims, 9 Drawing Sheets

FIG. 3
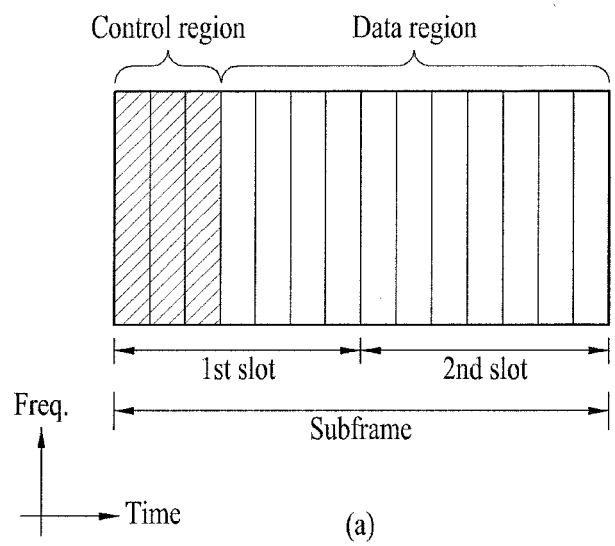
(a)
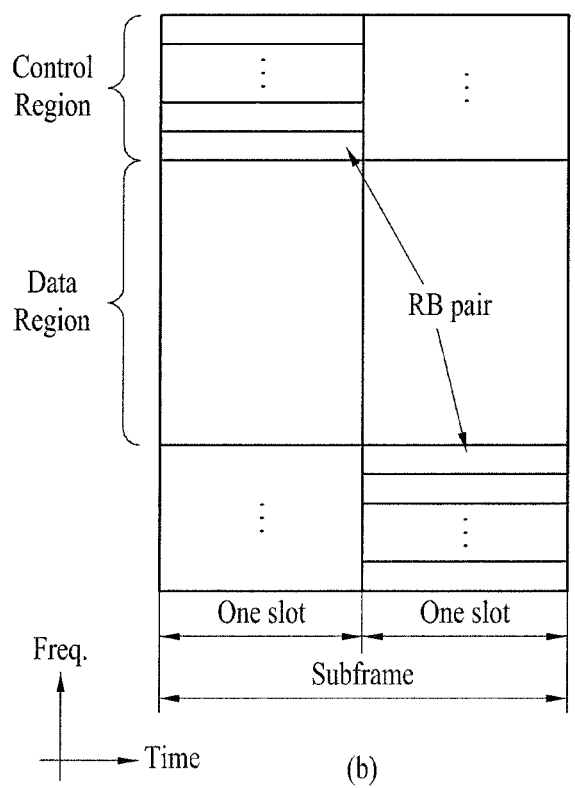
(b)

FIG. 5
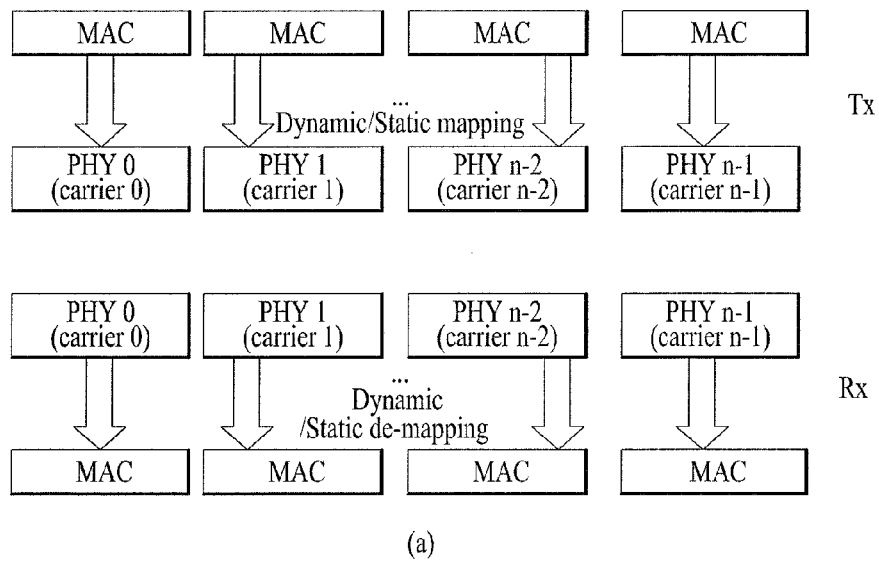
(a)
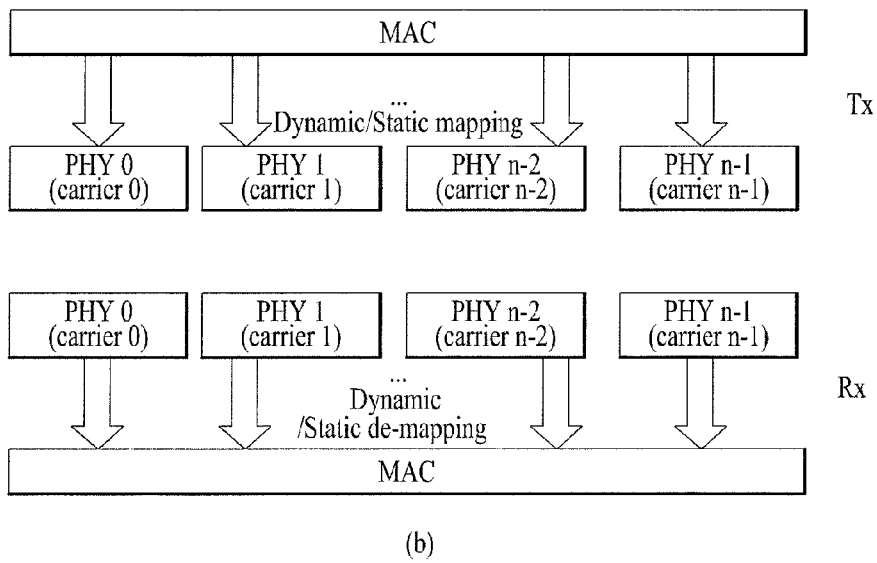
(b)

METHOD FOR SUPPORTING A DYNAMIC-TIME DIVISION DUPLEX (D-TDD) DOWNLINK-UPLINK CONFIGURATION IN A WIRELESS COMMUNICATION SYSTEM, AND APPARATUS THEREFOR

CROSS-REFERENCE TO RELATED APPLICATIONS

This application is the National Phase of PCT/KR2012/001577 filed on Mar. 2, 2012, which claims priority under 35 U.S.C. 119(e) to U.S. Provisional Application No. 61/448,144 filed on Mar. 1, 2011, all of which are hereby expressly incorporated by reference into the present application.

TECHNICAL FIELD

The present invention relates to wireless communication, and more particularly, to a method and apparatus for supporting dynamic-time division duplex (D-TDD) downlink-uplink configuration in a wireless communication system.

BACKGROUND ART

Techniques described herein may be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be embodied by radio technology such as universal terrestrial radio access (UTRA) or CDMA2000. TDMA may be embodied by radio technology such as global system for mobile communications (GSM)/general packet radio service (GPRS)/enhanced data rates for GSM evolution (EDGE). OFDMA may be embodied by radio technology such as IEEE 802.11 (Wi-Fi), IEEE 802.16 (WiMAX), IEEE 802-20, evolved UTRA (E-UTRA), etc. UTRA is a part of universal mobile telecommunications system (UMTS). 3rd generation partnership project (3GPP) long-term evolution (LTE) is a part of evolved UMTS (E-UMTS) using E-UTRA and employs OFDMA in downlink and SC-FDMA in uplink. LTE-advanced (LTE-A) is an evolved version of 3GPP LTE.

DISCLOSURE

Technical Problem

An object of the present invention devised to solve the problem lies in a method of supporting dynamic-time division duplex (D-TDD) downlink-uplink configuration by a first network node in a wireless communication system.

Another object of the present invention devised to solve the problem lies in a first network node apparatus for supporting D-TDD downlink-uplink configuration in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.]

Technical Solution

The object of the present invention can be achieved by providing a method of supporting dynamic-time division duplex (D-TDD) downlink-uplink configuration by a first network node in a wireless communication system, the method including setting a TDD downlink-uplink configuration set by selecting two or more TDD downlink-uplink configurations according to a predetermined rule among a plurality of predefined TDD downlink-uplink configurations, wherein, according to the predetermined rule, the two or more TDD downlink-uplink configurations are selected corresponding to number of subframes having different subframe type per subframe index from the plurality of the TDD downlink-uplink configurations. The types of the subframes may include a downlink subframe, an uplink subframe, and a special subframe. The method may further include transmitting information on the set TDD downlink-uplink configuration set to a second network node. The number may include at least 1, 1.5, 2, 2.5, 3.5, 4, 4.5, or 5.5. The setting of the TDD downlink-uplink configuration set may include setting a TDD downlink-uplink configuration in further consideration of number of single frequency network (SFN) support subframes.

In another aspect of the present invention, provided herein is a method of supporting dynamic-time division duplex (D-TDD) downlink-uplink configuration by a first network node in a wireless communication system, the method including setting a TDD downlink-uplink configuration set by selecting two or more TDD downlink-uplink configurations according to a predetermined rule among a plurality of predefined TDD downlink-uplink configurations, wherein, according to the predetermined rule, the two or more TDD downlink-uplink configurations are selected based on the number of subframes corresponding to all downlink sections from a single frequency network (SFN) support subframe index and remaining subframes except for a MBSFN subframe. The SFN subframe index may include at least 3, 4, 8, or 9. The number may include at least 1, 2, or 4. The method may further include transmitting information of the set TDD downlink-uplink configuration set to a second network node. The first network node may be a multi-cell/multicast coordination entity (MCE) and the second network node may be a base station.

In another aspect of the present invention, provided herein is a first network node for supporting dynamic-time division duplex (D-TDD) downlink-uplink configuration in a wireless communication system, the first network including a processor for setting a TDD downlink-uplink configuration set by selecting two or more TDD downlink-uplink configurations according to a predetermined rule among a plurality of predefined TDD downlink-uplink configurations, wherein, according to the predetermined rule, the two or more TDD downlink-uplink configurations corresponding to number of subframes having different subframe type per subframe index are selected from the plurality of the TDD downlink-uplink configurations.

In another aspect of the present invention, provided herein is a first network node for supporting dynamic-time division duplex (D-TDD) downlink-uplink configuration in a wireless communication system, the first network node including a processor for setting a TDD downlink-uplink configuration set by selecting two or more TDD downlink-uplink configurations among a plurality of predefined TDD downlink-uplink configurations, wherein the TDD downlink-uplink configuration set includes two or more TDD downlink-uplink configurations set based on the number of subframes corresponding to all downlink sections from a single frequency network (SFN) support subframe index and remaining subframes except for a MBSFN subframe. The first network node may further include a transmitter for transmitting information on the set TDD downlink-uplink configuration set to a second network node. The information of the set TDD downlink-uplink configuration set may be transmitted via an M2 interface.

Advantageous Effects

According to the present invention, performance of an overall communication system may be improved by overcoming problems such as interference between cells, which may arise during D-TDD support in a conventional system.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is diagrams illustrating a downlink subframe structure and an uplink subframe structure in a 3GPP LTE as an example of a mobile communication system;

FIG. 5 is a diagram illustrating configurations of a physical (PHY) layer (a first layer) and a MAC layer (a second layer) in a multiple carrier support system;

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be embodied according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, access point (AP), etc. Throughout this specification, the BS may include a cell, a sector, etc.

In a mobile communication system, a UE may receive information from a BS in downlink and transmit information in uplink. The information transmitted or received by the UE may be data and various control information. In addition, there are various physical channels according to the type or use of the information transmitted or received by the UE.

For clarity, the present invention will be described in terms of 3GPP LTE/LTE-A, but is not limited thereto. Specific terms used in the embodiments of the present invention are provided to aid in the understanding of the present invention. These specific terms may be replaced with other terms within the scope and spirit of the present invention.

Figure 1:
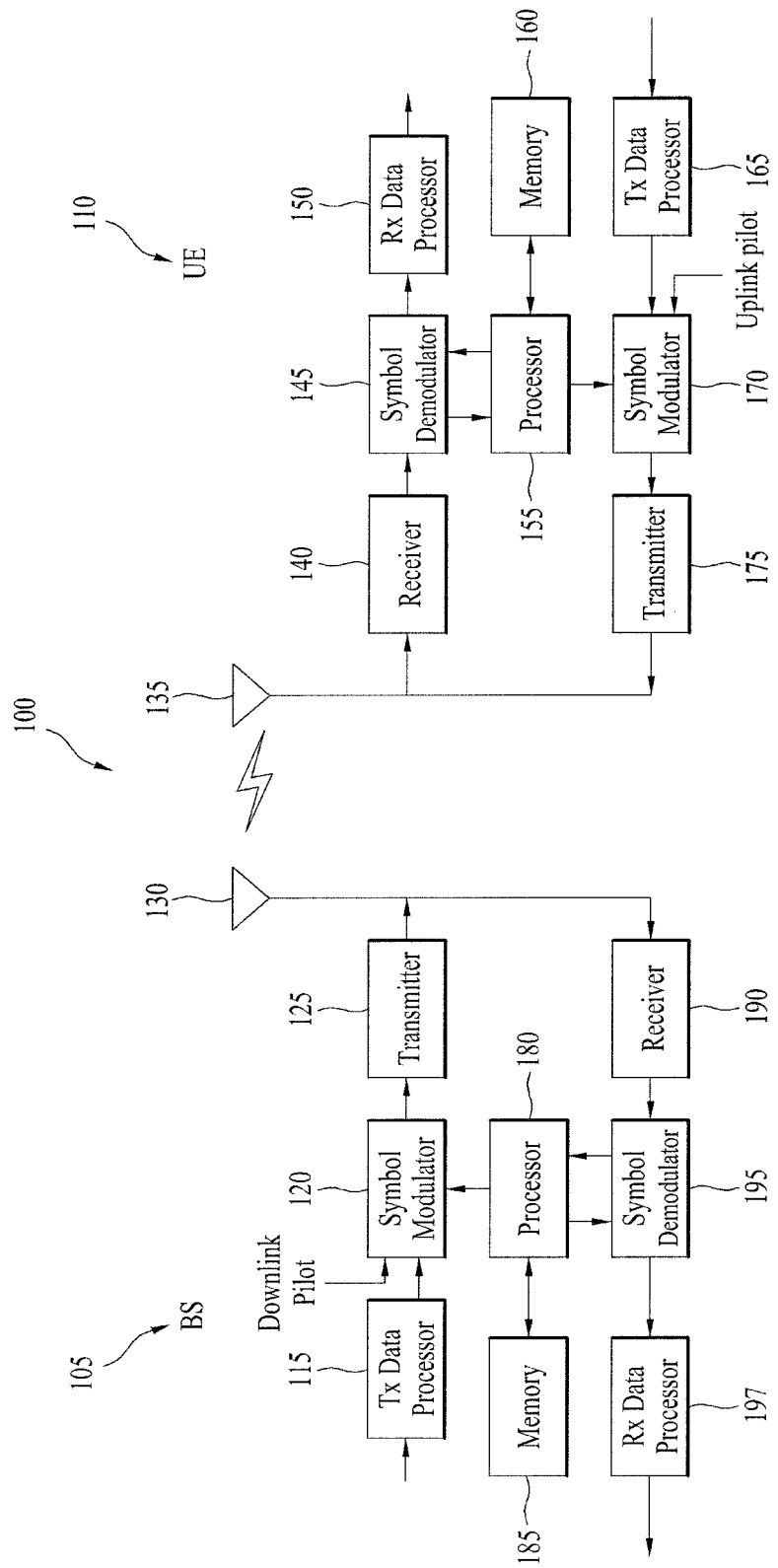
FIG. 1 is a block diagram illustrating configuration of a base station (BS) and a user equipment (UE) in a wireless communication system.

FIG. 1 is a block diagram illustrating configuration of a base station (BS) 105 and a user equipment (UE) 110 in a wireless communication system 100.

For simplification of the wireless communication system 100, one base station 105 and one UE 110 are illustrated. However, the wireless communication system 100 may include one or more BSs and/or UEs.

Referring to FIG. 1, the BS 105 may include a transmit (Tx) data processor 115, a symbol modulator 120, a transmitter 125, a transceiving antenna 130, a processor 180, a memory 185, a receiver 190, a symbol demodulator 195, and a receive (Rx) data processor 197. In addition, the UE 110 may include a transmit (Tx) data processor 165, a symbol modulator 170, a transmitter 175, a transceiving antenna 135, a processor 155, a memory 160, a receiver 140, a symbol demodulator 145, and a receive (Rx) data processor 150. One transceiving antenna 130 and one transceiving antenna 135 are illustrated in the BS 105 and the UE 110, respectively. However, the BS 105 and the UE 110 each include a plurality of transceiving antennas. Thus, the BS 105 and the UE 110 according to the present invention support a multiple input multiple output (MIMO) system. In addition, the BS 105 according to the present invention may support both single user-MIMO (SU-MIMO) and multi user-MIMO (MU-MIMO).

In downlink, the Tx data processor 115 receives traffic data, formats and codes the received traffic data, and interleaves and modulates (or symbol-maps) the coded traffic data to provide modulated symbols ("data symbols"). The symbol modulator 120 receives and processes the data symbols and pilot symbols to provide a stream of the symbols.

The symbol modulator 120 multiplexes the data and pilot symbols and transmits the multiplexed data and pilot symbols to the transmitter 125. In this case, each of the transmitted symbols may be a data symbol, a pilot symbol, or a signal value of zero. In each symbol period, pilot symbols may be consecutively transmitted. The pilot symbols may be frequency division multiplexed (FDM), orthogonal frequency division multiplexed (OFDM), time division multiplexed (TDM), or code division multiplexed (CDM) symbols.

The transmitter 125 receives the stream of the symbols and converts the stream into one or more analog signals. In addition, the transmitter 125 further adjusts (e.g., amplifies, filters, and frequency-upconverts) the analog signals to generate a downlink signal suitable for transmission through a radio channel. Then, the transceiving antenna 130 transmits the generated downlink signal to the UE 110.

In configuration of the UE 110, the transceiving antenna 135 receives the downlink signal from the BS 105 and provides the received signal to the receiver 140. The receiver 140 adjusts (e.g., filters, amplifies, and frequency-downconverts) the received signal, and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, performs data demodulation on the received data symbols to obtain a data symbol estimated value (which corresponds to estimated values of transmitted data symbols), and provides the data symbol estimated value to the Rx data processor 150. The Rx data processor 150 demodulates (that is, symbol-demaps) the data symbol estimated values, and deinterleaves and decodes the data symbol estimated values to restore transmitted traffic data.

Processing by the symbol demodulator 145 and the Rx data processor 150 is auxiliary to processing by the symbol modulator 120 and the Tx data processor 115 in the BS 105, respectively.

In the UE 110, in uplink, the Tx data processor 165 processes traffic data to provide data symbols. The symbol modulator 170 may receive the data symbols and multiplex and demodulate the data symbols to provide a stream of the symbols to the transmitter 175. The transmitter 175 receives and processes the stream of the symbols to generate an uplink signal. In addition, the transceiving antenna 135 transmits the generated uplink signal to the BS 105.

In the BS 105, the uplink signal is received from the UE 110 through the transceiving antenna 130, and the receiver 190 acquires samples obtained by processing the received uplink signal. Then, the symbol demodulator 195 processes the samples to provide pilot symbols and a data symbol estimated value, which are received for uplink. The Rx data processor 197 processes the data symbol estimated value to restore the traffic data transmitted from the UE 110.

The processors 155 and 180 of the UE 110 and the BS 105 order (e.g., control, adjust, manage, etc.) operations in the UE 110 and the BS 105, respectively. The processors 155 and 180 may be respectively connected to the memories 160 and 185 that store program code and data. The memories 160 and 185 are connected to the processor 180 and store an operating system, application, and general files.

The processors 155 and 180 may also be called a controller, a microcontroller, a microprocessor, a microcomputer, etc. The processors 155 and 180 may be embodied by hardware, firmware, software, or a combination thereof. When embodiments of the present invention are embodied using hardware, the processors 155 and 180 may include application specific integrated circuits (ASICs), digital signal processors (DSPs), digital signal processing devices (DSPDs), programmable logic devices (PLDs), field programmable gate arrays (FPGAs), etc. which are configured to implement the present invention.

When embodiments of the present invention are embodied using firmware or software, the firmware or the software may be configured to contain a module, process, or function used to perform functions or operations according to the present invention. The firmware or software configured to implement the present invention may be included in the processors 155 and 180 or may be stored in the memories 160 and 185 and driven by the processors 155 and 180.

Layers of a wireless interface protocol between a UE and a wireless communication system (network) and between a BS and the system may be classified into a first layer L1, a second layer L2, and a third layer L3 based on the three lower layers of the open systems interconnection (OSI) model that is well known in the field of communications. A physical layer belongs to the first layer L1 and provides an information transmission service through a physical channel. A radio resource control (RRC) layer belongs to the third layer and provides control radio resources between the UE and the network. The UE and the base station may exchange RRC messages through the wireless communication network and the RRC layer.

Figure 2:
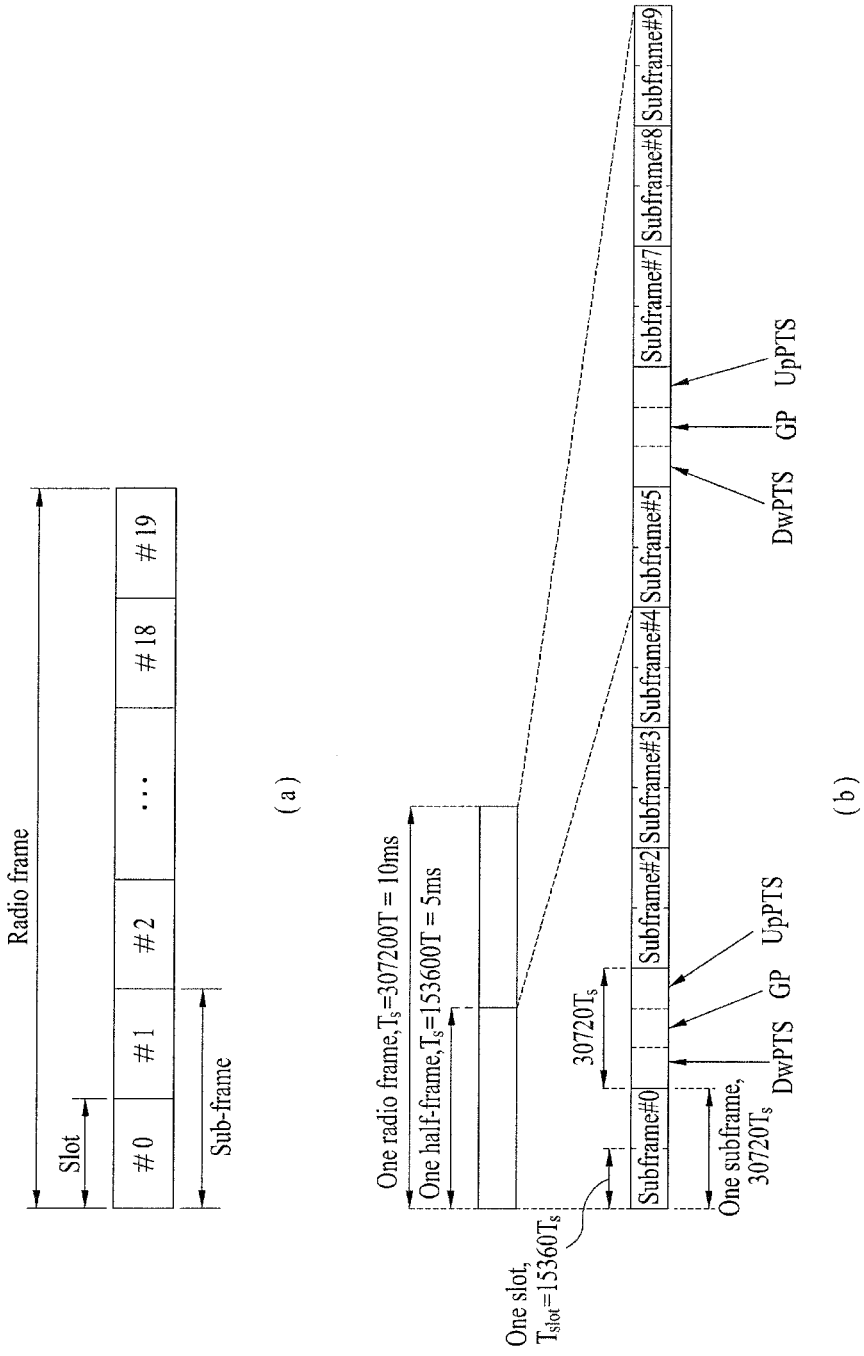
FIG. 2(A) illustrates a structure of a radio frame used in a 3rd generation partnership project (3GPP) long-term evolution (LTE) system as an example of a wireless communication system.
FIG. 2(B) illustrates a frame structure type 2 of 3GPP LTE as an example of a wireless communication system.

FIG. 2(A) illustrates a structure of a radio frame used in a 3GPP LTE system as an example of a wireless communication system.

Referring to FIG. 2(A), one radio frame has a length of 10 ms (327200·$T_s$) and includes ten subframes of equal size. Each subframe has a length of 1 ms and includes two slots. Each slot has a length of 0.5 ms (15360·$T_s$). Here, $T_s$ represents sampling time and is represented by $T_s=1/(15 \text{ kHz} \times 2048)=3.2552 \times 10^{-8}$ (about 33 ns). The slot includes a plurality of OFDM symbols or single carrier-frequency division multiple access (SC-FDMA) symbols in a time domain and a plurality of resource blocks (RBs) in a frequency domain.

In an LTE system, one resource block includes twelve subcarriers x seven (or six) OFDM symbols or SC-FDMA symbols. A transmission time interval (TTI), which is a data transmission time unit, may be determined in a unit of one or more subframes. The aforementioned structure of the radio frame is merely an example, and various modifications may be made in the number of subframes included in the radio frame, the number of slots included in the subframe, or the number of OFDM symbols or SC-FDMA symbols included in the slot.

FIG. 2(B) illustrates a frame structure type 2 of 3GPP LTE as an example of a wireless communication system.

Referring to FIG. 2(B), the frame structure type 2 is applied to time division duplex (TDD). As in FIG. 2(A), one radio frame has a length of 10 ms (327200·$T_s$) and includes ten subframes of equal size. Each subframe has a length of 1 ms and includes two slots. Each slot has a length of 0.5 ms (15360·$T_s$). Here, $T_s$ represents sampling time and is represented by $T_s=1/(15 \text{ kHz} \times 2048)=3.2552 \times 10^{-8}$ (about 33 ns).

Each half-frame includes five subframes. "D" denotes a subframe reserved for downlink transmission, "U" denotes a subframe reserved for uplink transmission, and "S" denotes a special subframe including a downlink pilot time slot (DwPTS), a guard period (GP), and an uplink pilot time slot (UpPTS). DwPTS is used for initial cell search, synchronization, or channel estimation by a UE. UpPTS is used for channel estimation by a BS and uplink transmission synchronization in a UE. GP is a period for removal of interference generated in uplink due to multipath delay of a downlink signal between uplink and downlink.

In case of 5 ms downlink-to-uplink switch-point periodicity, the special subframe S exists in all half-frames. In case of 5 ms downlink-to-uplink switch-point periodicity, the special subframe S exists in a first half-frame only. Subframes #0 and 5 (subframes 0 and 5) and DwPTS are always reserved for downlink transmission. A subframe immediately subsequent to UpPTS and the special subframe is always reserved for uplink transmission. When multiple cells are aggregated, the UE assumes the same uplink-downlink configuration across all the cells and that GPs of special subframes in different cells have an overlap of at least $1456 \cdot T_s$. The aforementioned structure of the radio frame is merely an example and various modifications may be made in the number of subframes included in the radio frame, the number of slots included in the subframe, or the number of symbols included in the slot.

Table 1 below shows special subframe configuration (length of DwPTS/GP/UpPTS).

located in a front part of a first slot of a downlink subframe correspond to a control region to which control channels are allocated. The remaining OFDM symbols correspond to a data region to which a physical downlink shared channel (PDSCH) is allocated.

The downlink control channels used in a 3GPP LTE system, etc. may include a physical control format indicator channel (PCFICH), a physical downlink control channel (PDCCH), or a physical hybrid-ARQ indicator channel (PHICH). The PCFICH transmitted in a first OFDM symbol of a subframe carries information regarding the number (that is, an area of the control region) of OFDM symbols used for transmission of control channels within a subframe. The control information transmitted through the PDCCH is referred to as downlink control information (DCI). The DCI refers to uplink resource allocation information, downlink resource allocation information, uplink transmit power control command to arbitrary UE groups, etc. The PHICH carries acknowledgement (ACK)/negative acknowledgement (NACK) signals as a response to uplink hybrid automatic repeat request (HARQ). That is, the ACK/NACK

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 below shows uplink-downlink configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 2 above, a frame structure type 2 of 3GPP LTE system has seven uplink-downlink configurations. According to configurations, the position or number of a downlink subframe, a special frame, and an uplink subframe may be differently configured. Hereinafter, various embodiments of the present invention will be described in terms of uplink-downlink configurations of the frame structure type 2 shown in Table 2 above.

FIG. 3 is diagrams illustrating a downlink subframe structure and an uplink subframe structure in a 3GPP LTE as an example of a mobile communication system.

Referring to FIG. 3(*a*), one downlink subframe includes two slots in a time domain. A maximum of 3 OFDM symbols signals as a response to the uplink data transmitted from a UE are transmitted on the PHICH.

Hereinafter, the PDCCH as a downlink physical channel will be described.

A BS may transmit resource allocation and transmission format of PDSCH (which are also referred to as DL grant), resource allocation information of PUSCH (which is also referred to as UL grant), an aggregate set of a transmit power control (TPC) command of an arbitrary UE and individual UEs in a group, and activation of voice over Internet protocol (VoIP) through the PDCCH. The BS may transmit a plurality of PDCCHs in the control region and the UE may monitor the plural PDCCHs. The PDCCH includes an aggregate of one or more contiguous control channel elements (CCEs). The BS may transmit the PDCCH including the aggregate of one or more contiguous CCEs through subblock interleaving and then transmit the PDCCH through the control region. The CCE is a logical allocation unit used to provide a coding rate to a PDCCH based on a radio channel state. The CCE corresponds to a plurality of resource element groups. A format of a PDCCH and a bit number of available PDCCHs are determined according to a relationship between the number of CCEs and a coding rate provided by the CCEs.

Control information transmitted through the PDCCH by the BS is referred to as downlink control information (DCI). The BS may transmit the control information transmitted through the PDCCH according to a DCI format shown in Table 3 below.

TABLE 3

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

As shown in Table 3 above, the DCI format 0 indicates uplink resource allocation information, the DCI formats 1 and 2 indicate downlink resource allocation information, and the DCI formats 3 and 3A indicate uplink transmit power control (TPC) commands of arbitrary UE groups. The DCI format 3/3A includes TPC commands of a plurality of UEs. In the case of the DCI format 3/3A, the BS masks TPC-ID onto CRC. The TPC-ID is an identifier for demasking in order for the UE to monitor a PDCCH carrying a TPC command. The TPC-ID may be an identifier used to decode a PDCCH by the UE in order to check whether the TPC command is transmitted on the PDCCH. The TPC-ID may be defined by reusing conventional identifiers, for example, a cell-radio network temporary identifier (C-RNTI), a paging indication-radio network temporary identifier (PI-RNTI), a system change-radio network temporary identifier (SC-RNTI), or a random access radio network temporary identifier (RA-RNTI), or may be defined as a new identifier. The TPC-ID is different from the C-RNTI as an identifier for a specific UE, and the PI-RNTI, the SC-RNTI, and RA-RNTI, which are for all UEs in a cell, in that the TPC-ID is an identifier for UEs of a specific set in a cell. This is because, when the DCI includes a TPC command for N UEs, only the N UEs has only to receive TPC commands. When the DCI includes TPC commands of all UEs in a cell, the TPC-ID is an identifier for all UEs in a cell.

The UE monitors an aggregate of PDCCH candidates in a search space in a subframe to search for the TPC-ID. In this case, the TPC-ID may be searched for in a common search space or in a UE specific search space. The common search space is a search space in which all UEs search for the TPC-ID, and the UE specific search space is a search space in which a specific UE searches for the TPC-ID. When the TPC-ID is demasked in a corresponding PDCCH candidate, if CRC error is not detected, the UE may receive the TPC command on the PDCCH.

An identifier for a PDCCH carrying only a plurality of TPC commands, and a TPC-ID are defined. When the TPC-ID is detected, the UE receives the TPC command on the corresponding PDCCH. The TPC command is used to adjust transmission power of an uplink channel, thereby preventing failure in transmission to the BS due to incorrect power control or interference to another UE.

Hereinafter, a method of mapping resources for transmitting a PDCCH by a BS in an LTE system, etc. will be briefly described.

In general, the BS may transmit scheduling allocation information and other control information through a PDCCH. A physical control channel may be transmitted to one aggregate or a plurality of contiguous control channel elements (CCEs). One CCE includes nine resource element groups (REGs). The number of REGs that are not allocated to a physical control format indicator channel (PCFICH) or a physical hybrid automatic repeat request indicator channel (PHICH) is NREG. The number of CCEs that are available in a system is 0 to $N_{CCE}-1$ (where $N_{CCE}=\lfloor N_{REG}/9 \rfloor$). The PDCCH supports a multiple format shown in Table 4 below. One PDCCH including n contiguous CCEs begins from a CCE operating in i mod n=0 (where i is a number of CCE). Multiple PDCCHs may be transmitted in one subframe.

TABLE 4

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As shown in Table 4 above, the BS may determine a PDCCH format according to the number of regions to which control information, etc. is to be transmitted. The UE may read control information in unit of CCE so as to reduce overhead.

Referring to FIG. 3(b), an uplink subframe may be divided into a control region and a data region in a frequency domain. The control region is allocated to a physical uplink control channel (PUCCH) for carrying uplink control information. The data region is allocated to a physical uplink shared channel (PUSCH) for carrying user data. In order to maintain a single carrier property, one UE does not simultaneously transmit a PUCCH and a PUSCH. A PUCCH for one UE is allocated to an RB pair in one subframe. RBs belonging to an RB pair occupy different subcarriers in two slots. Frequency hopping is performed on the RB pair allocated to the PUCCH at a slot boundary.

Figure 4:
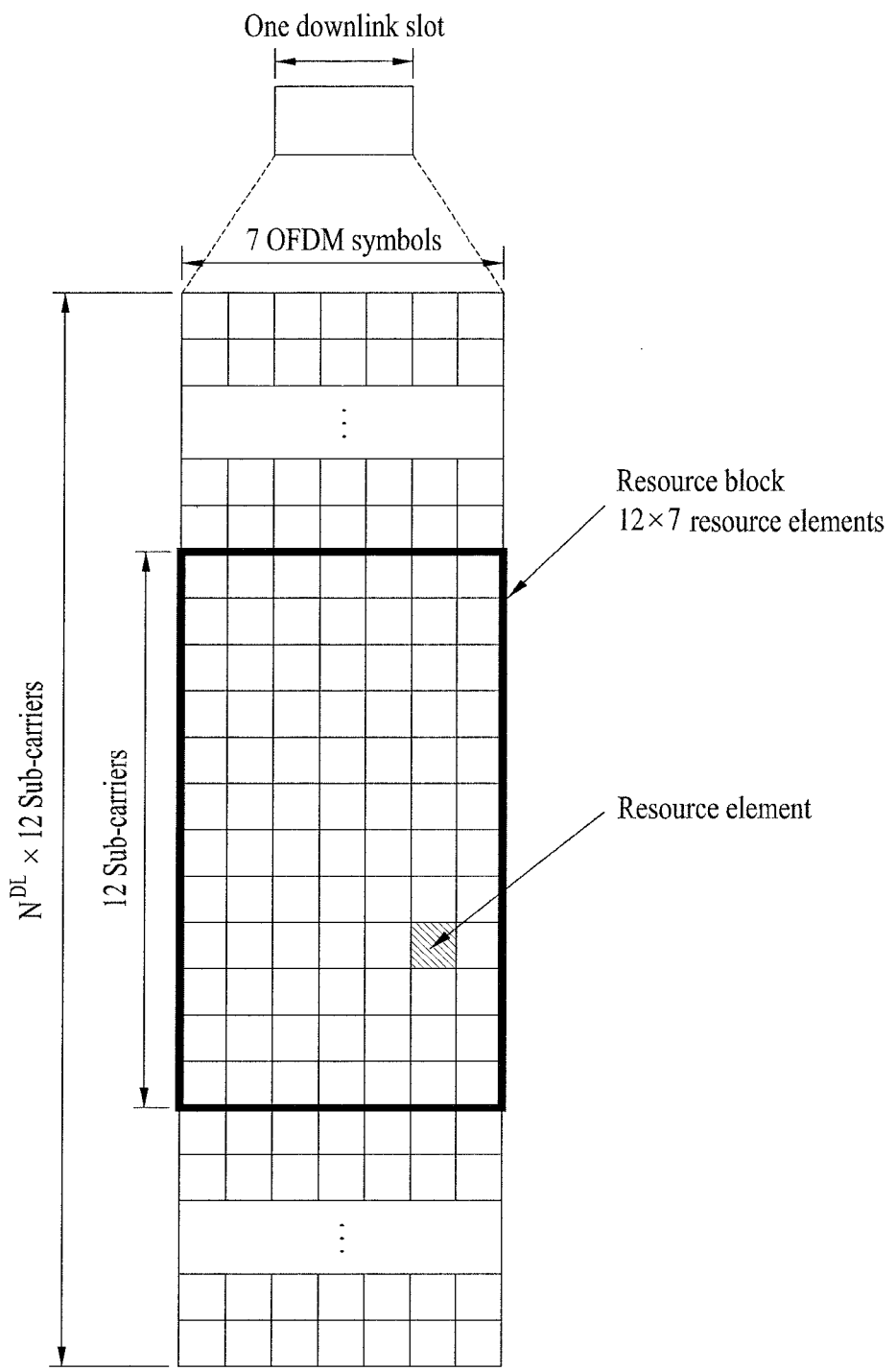
FIG. 4 is a diagram illustrating a downlink time-frequency resource grid structure in a 3GPP LTE system.

FIG. 4 is a diagram illustrating a downlink time-frequency resource grid structure in a 3GPP LTE system.

A downlink signal transmitted in each slot is used as a resource grid structure including $N_{RB}^{DL} \times N_{SC}^{RB}$ subcarriers and $N_{symb}^{DL}$ orthogonal frequency division multiplexing (OFDM) symbols. Here, $N_{RB}^{DL}$ represents the number of resource blocks (RBs) in downlink, $N_{SC}^{RB}$ represents the number of subcarriers included in one RB, and $N_{symb}^{DL}$ represents the number of OFDM symbols in one downlink slot. The size of $N_{RB}^{DL}$ is determined according to a downlink transmission bandwidth configured in a cell and needs to satisfy $N_{RB}^{min,DL} \leq N_{RB}^{DL} \leq N_{RB}^{max,DL}$. Here, $N_{RB}^{min,DL}$ is a minimum downlink bandwidth supported by a wireless communication system and $N_{RB}^{max,RB}$ is a maximum downlink bandwidth supported by the wireless communication system. $N_{RB}^{min,DL}=6$ and $N_{RB}^{max,RB}=110$ may be satisfied, however, embodiments of the present invention are not limited thereto. The number of OFDM symbols included in one slot may vary according to the length of a cyclic prefix (CP) and an interval of subcarriers. In case of multiple antenna transmission, one resource grid may be defined per antenna port.

Each element in resource grids of respective antenna port is referred to as a resource element (RE) and is identified only by an index pair (k,l) in a slot. Here, k is an index in a frequency domain, l is an index in a time domain, k has any one value of $0, \ldots, N_{RB}^{DL} N_{SC}^{RB}-1$, and l has any one value of $0, \ldots, N_{symb}^{DL}-1$.

An RB illustrated in FIG. 4 is used to describe a mapping relationship between a physical channel and resource elements. The RB may be divided into a physical resource block (PRB) and a virtual resource block (VRB). One PRB is defined using $N_{symb}^{DL}$ contiguous OFDM symbols in a time domain and $N_{SC}^{RB}$ contiguous subcarriers in a frequency domain. Here, $N_{symb}^{DL}$ and $N_{SC}^{RB}$ may be predetermined. For example, $N_{symb}^{DL}$ and $N_{SC}^{RB}$ may be given as shown in Table 5 below. Thus, one PRB includes $N_{symb}^{DL} \times N_{SC}^{RB}$ resource elements. One PRB may correspond to one slot in a time domain and correspond to 180 kHz in a frequency domain. However, embodiments of the present invention are not limited thereto.

TABLE 5

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

PRB has a value from 0 to $N_{RB}^{DL}-1$ in a frequency domain. A relationship between a PRB number $n_{PRB}$ and a resource element (k,l) in one slot in a frequency domain satisfies $$n_{PRB} = \left\lfloor \frac{k}{N_{sc}^{RB}} \right\rfloor.$$

The size of the VRB is the same as the size of PRB. The VRB may be defined to be divided into a localized VRB (LVRB) and a distributed VRB (DVRB). With regard to each type of VRB, one pair of VRBs in two slots in one subframe is allocated together with a single VRB number $n_{VRB}$.

The VRB may have the same size as that of the PRB. Two types of VRBs are defined. A first type of VRB is a localized VRB (LVRB) and a second type of VRB is a distributed VRB (DVRB). With regard to each type of VRB, one pair of VRBs has a single VRB index (hereinafter, referred to as a VRB number) and allocated across two slots of one subframe. In other words, any one index among indexes from 0 to $N_{RB}^{DL}-1$ is allocated to $N_{RB}^{DL}$ VRBs belonging to a first of two slots included in one subframe, and any one index from indexes from 0 to $N_{RB}^{DL}-1$ is also allocated to $N_{RB}^{DL}$ VRBs belonging to a second of the two slots.

Hereinafter, a process of transmitting a PDCCH to a UE from a BS in a LTE system will be described.

The BS determines a PDCCH format according to downlink control information (DCI) transmitted to the UE and adds cyclic redundancy check (CRC) to control information. A unique identifier (which is referred to as a radio network temporary identifier (RNTI)) is masked onto the CRC according to the owner or use of the PDCCH. When the PDCCH is for a specific UE, a unique identifier of the UE, for example, a cell-RNTI (C-RNTI) may be masked onto the CRC. In addition, if the PDCCH is for a paging message, a paging indicator identifier, for example, paging-RNTI (P-RNTI) may be masked onto the CRC. When the PDCCH is for system information, a system information identifier, that is, a system information-RNTI (SI-RNTI) may be masked onto the CRC. In order to indicate a random access response as a response to transmission of a random access preamble of the UE, a random access-RNTI (RA-RNTI) may be masked onto CRC. Table 6 below shows examples of identifiers masked onto a PDCCH.

TABLE 6

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

When the C-RNTI is used, the PDCCH carries control information for a corresponding specific UE. When another RNTI is used, the PDCCH carries common control information received by all UEs or a plurality of UEs in a cell. The BS performs channel coding on the DCI to which the CRC is added to generate coded data. In addition, the BS performs rate matching according to the number of CCEs allocated to a PDCCH format. Then, the BS modulates the coded data to generate modulation symbols. In addition, the BS maps the modulation symbols to a physical resource element.

Carrier Aggregation

According to design 3rd generation partnership project (3GPP) specification, a next generation wireless communication system of an LTE system is referred to as a long term evolution-advanced (LTE-A) system and may transmit a large amount of data at high speed. The LTE-A system employs carrier aggregation (CA) technology whereby a plurality of component carriers (CCs) is aggregated and performs transmission to increase a transmission bandwidth of the UE and to increase frequency usage efficiency. The LTE-A system may aggregate a plurality of carriers (i.e., a multicarrier) and simultaneously use the plural aggregated carriers, instead of one single carrier that was used in conventional LTE Rel-8/9, and may extend a bandwidth up to 100 MHz. In other words, a carrier that was used in conventional LTE LTE Rel-8/9 and defined up to a maximum of 20 MHz is redefined as a component carrier (or element carrier), and one UE uses a maximum of 5 component carriers (CCs) via carrier aggregation technologies.

Current carrier aggregation technology has the following features.

(1) Aggregation of contiguous component carriers is supported and aggregation of non-contiguous component carriers is supported.

(2) The number of uplink carrier aggregations and the number of downlink carrier aggregations may differ. When the current system needs to be compatible with a previous system, uplink and downlink may include the same number of component carriers.

(3) Different numbers of component carriers may be configured for uplink/downlink to obtain different transmission bandwidths.

(4) With regard to a UE, each component carrier (CC) independently transmits one transport block and includes an independent hybrid automatic repeat request (HARQ) mechanism.

Unlike a conventional LTE system using one carrier, carrier aggregation using a plurality of CCs requires a method of effectively managing a component carrier. In order to effectively manage the component carrier, component carriers may be classified according to the function and features thereof. The component carriers may be classified into a primary component carrier (PCC) and a secondary component carrier (SCC). One PCC is defined per UE as a component carrier that is the center for managing a plurality of component carriers during use of the plural component carriers. The PCC may be referred to as a primary cell (Pcell), etc.

In addition, other component carriers except for one PCC are defined as secondary component carriers (SCCs). The SCC may also be referred to as a secondary cell (Scell), etc. The PCC may function as a core carrier for managing all aggregated component carriers and the remaining SCCs may further provide frequency resources for providing a high transfer rate. For example, connection (RRC) for signaling between the BS and the UE may be achieved via the PCC. Information for security and upper layers may also be provided via the PCC. In reality, when only one component carrier is present, the corresponding component carrier may be a PCC, and in this case, may perform the same function as that of a carrier of the conventional LTE system.

In the carrier aggregation, a downlink resource may be defined as a downlink component carrier (DL CC) and an uplink resource may be defined as an uplink component carrier (UL CC). In addition, a combination of the downlink resource and the uplink resource may be referred to as a cell. However, when the DL CC and the UL CC are asymmetrically configured, the cell may indicate only the DL CC (or UL CC). For example, when one serving cell is set for a specific UE, the UE may include 1 DL CC and 1 UL CC. However, when two or more serving cells are set for the specific UE, the UE may have DL CCs, the number of which is the same as that of the cells, and UL CCs, the number of which is equal to or less than the number of the DL CCs. In addition, when a plurality of serving cells is set for the specific UE, a CA environment in which the number of UL CCs is greater than the number of DL CCs may be supported.

Linkage between a carrier frequency (a cell central frequency) of downlink resource and a carrier frequency of uplink resource may be indicated by system information (SI) transmitted on the downlink resource. For example, a combination of the DL resource and the UL resource may be configured by the linkage defined by a system information block type 2 (SIB2).

According to this definition, carrier aggregation (CA) may refer to aggregation of two or more cells having different carrier frequencies. That is, a case in which two or more serving cells having different carrier frequencies are set for a specific UE may be referred to as a CA environment. With regard to UEs supporting CA, one or more secondary cells (SCells) and primary cells (PCells) may be aggregated so as to support an increased bandwidth.

Here, a serving cell may be a PCell or a SCell. When an RRC-connected UE does not support CA, only one serving cell including the PCell is present. In addition, when the RRC_connected UE supports CA, the term serving cell refers to a set of one or more cells including the PCell and the SCell.

The PCell is a cell that is the center of control related communication, among serving cells set in the CA environment. A cell indicated or used in an initial connection establishment procedure, a connection re-establishment procedure, or a handover process by the UE may be a PCell. The UE may receive important control information (e.g., PUCCH) through a PCell of the UE and perform monitoring processes of acquiring and changing system information only in the PCell. However, as necessary, the UE may receive the control information, etc. through the SCell. With regard to the UE supporting the CA, the BS may change PCell via only a handover process using an RRCConnectionReconfiguration message including mobilityControllnfo.

Then, the SCell refers to remaining cells except for the PCell, among serving cells set in the CA environment. A PUCCH is not present in the SCell. When the SCell is added, the BS may provide all system information related to an operation in a corresponding cell in an RRC_CONNECTED state to the UE supporting CA via dedicated signaling. With regard to the SCell, the system information may be changed by release and addition of a corresponding SCell through one RRCConnectionReconfiguration message. The BS may transmit dedicated signaling including a parameter, which is different from a parameter included in a broadcast message, to the UE in the corresponding SCell. After an initial security activation procedure, the BS may set one or more SCells for the UE in addition to the PCell (which is a cell set as a serving cell during a connection establishment procedure). The PCell is used to provide security input and upper layer system information. The SCell may provide additional downlink resources and may be used to provide uplink resources as necessary. The BS may independently add, remove, or correct the SCell via an RRC connection re-establishment procedure using an RRCConnectionReconfiguration message that includes or does not include mobilityControlInfo.

In short, according to CA, multiple carriers are classified into a PCell and an SCell, each of which is a UE-specific parameter. A specific UE may have one or more set serving cells. When a plurality of set serving cells is present, a cell of the plural cells is a PCell, and the remaining cells are SCells. Here, the PCell may be set as a cell having the lowest index among cell indexes (e.g., ServCellIndex). In addition, in case of TDD, when the UE has a plurality of set serving cells, UL-DL configurations for definition of a UL subframe through which ACK/NACK of a PDSCH is transmitted in a specific DL subframe may be the same in all cells.

In addition, the UE may transmit uplink control information, measured from one or more CCs, such as channel state information (CSI) (which correctively refers to CQI, RI, PMI, etc.), HARQ ACK/NACK, etc. to the BS from one predetermined CC. For example, the UE may collect (e.g., ACK/NACK multiplex or ACK/NACK bundle) a plurality of ACK/NACK information received from the PCell DL CC and the SCell(s) DL CC and transmit the ACK/NACK information using one PUCCH in the PCell UL CC.

FIG. 5 is a diagram illustrating configurations of a physical (PHY) layer (a first layer, L1) and a MAC layer (a second layer, L2) in a multiple carrier support system.

In a BS of a conventional wireless communication system supporting a single carrier, one PHY object for supporting one carrier is present, and one medium access control (MAC) object for controlling one PHY object may be provided. In the PHY layer, for example, a baseband processing operation may be performed. In the MAC layer, for example, a transmitter may generate a MAC protocol data unit (MAC PDU) and perform an L1/L2 scheduler operation over MAC/RLC sublayers. A MAC PDU packet of the MAC layer is converted into a transport block through a logical transfer layer and is then mapped to a PHY layer input information block. The MAC layer illustrated in FIG. 5 may be represented by all the layers L2 and may be interpreted as including MAC/RLC/PDCP sublayers. This application may be applied in the same way in the detailed description of the MAC layer throughout this specification.

In the multi-carrier support system, a plurality of MAC-PHY objects may be provided. That is, as illustrated in FIG. 5(A), a transmitter and a receiver of the multiple carrier support system may be configured such that one MAC-PHY object corresponds to each of n configured carriers. An independent PHY layer and MAC layer are configured for each of the configured carriers, and thus, a PDSCH is generated for each of the configured carriers in a PHY layer from the MAC PDU.

Alternatively, in the multiple carrier support system, one common MAC object and a plurality of PHY objects may be configured. That is, as illustrated in FIG. 5(B), a transmitter and a receiver of the multiple carrier support system may be configured such that n PHY objects respectively corresponding to the n configured carriers are provided and one common MAC object for controlling the n PHY objects is present. In this case, the MAC PDU from one MAC layer may be divided into a plurality of transmission blocks respectively corresponding to the plural configured carriers on a transmission layer. In addition, when a MAC PDU is generated on the MAC layer or an RLC PDU is generated on the RLC layer, the MAC PDU may be divided for the respective configured carriers. Thus, a PDSCH is generated per configured carrier on a PHY layer.

Figure 6:
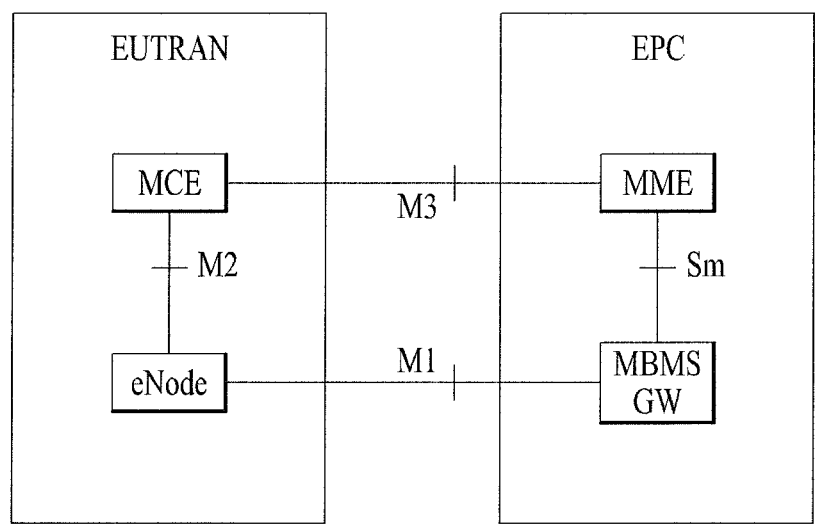
FIG. 6 is a diagram illustrating a general structure for E-UTRAN MBMS.

FIG. 6 is a diagram illustrating a general structure for E-UTRAN MBMS.

Referring to FIG. 6, an E-UTRAN includes a multi-cell/multicast coordination entity (MCE) and an eNode. The MCE and the eNode are connected via an M2 interface. The M2 interface is a control plane interface in the E-UTRAN. An evolved packet core (EPC) includes an MME and an MBMS gateway (MBMS GW). The MME and the MBMS GW are connected via an Sm interface. In addition, the MCE of the E-UTRAN and the MME of the EPC are connected via an M3 interface. The eNode of the E-UTRAN is connected to the MBMS GW of the EPC via an M1 interface. Here, the M3 interface is a control plane interface between the E-UTRAN and the EPC and the M1 interface is a user plane interface. The MBMS GW may be connected to a plurality of BSs via the M1 interface for data distribution. The MCE may be connected to one or more BSs in the same MBSFN via the M2 interface for MBMS session management signaling and wireless configuration signaling.

In a conventional TDD system, various ratios (DL/UL ratios) between numbers of downlink subframes and uplink subframes are defined, but one DL/UL ratio is used per multi-cell in principle. However, traffic volumes between cells are different, and thus, a dynamic-TDD (D-TDD) system for adjusting and using a DL/UL ratio based on traffic volume between cells is required. In a conventional system, when the D-TDD system is used, various problems may arise accordingly. These problems will now be described with reference to FIG. 7.

Figure 7:
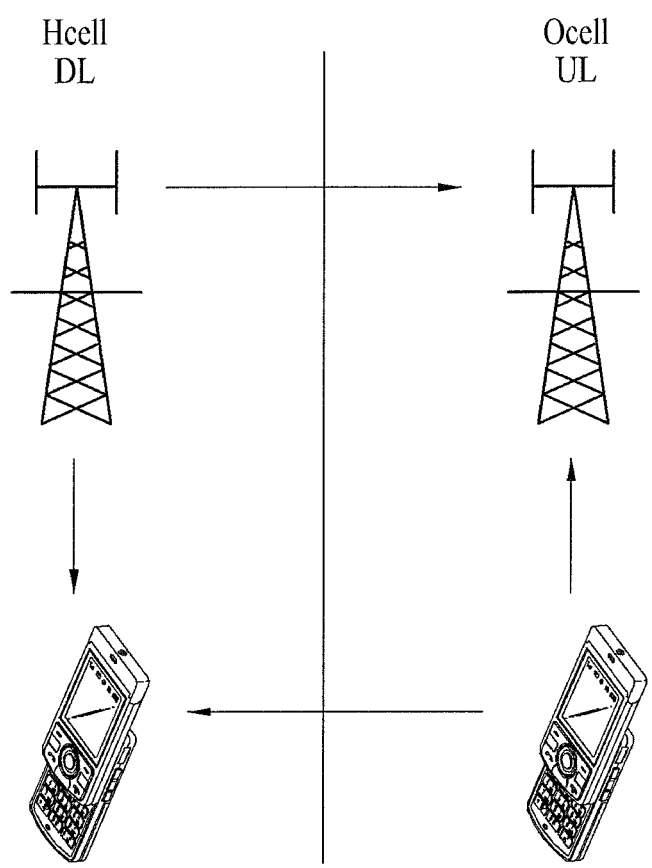
FIG. 7 is a diagram for conceptually explaining interference modeling in a D-TDD system.

FIG. 7 is a diagram for conceptually explaining interference modeling in a D-TDD system.

When a home cell (Hcell) and other cells (Ocells) may transmit a downlink signal and an uplink signal in a predetermined time duration, interference may occur. Interference may occur due to un-aligned downlink/uplink (DL/UL) (e.g., downlink subframe/uplink subframe) allocation between BSs. When D-TDD is used, the Hcell and the Ocell may have different DL/UL ratios in the same carrier. An uplink section and a downlink section between the Hcell and the Ocell are changed, and thus, interference may occur.

Referring to FIG. 7, when a specific time duration configured in the Hcell is allocated to a downlink section, the Hcell transmits a downlink signal to a UE 1 in the downlink section. However, in the Ocell, when the specific time duration is allocated to an uplink section, a UE 2 transmits an uplink signal to the Ocell in the specific time duration. Thus, downlink transmission in the specific time duration of the Hcell interferes in the Ocell, and uplink transmission in the specific time duration of the UE 2 interferes in the UE 1.

Figure 8:
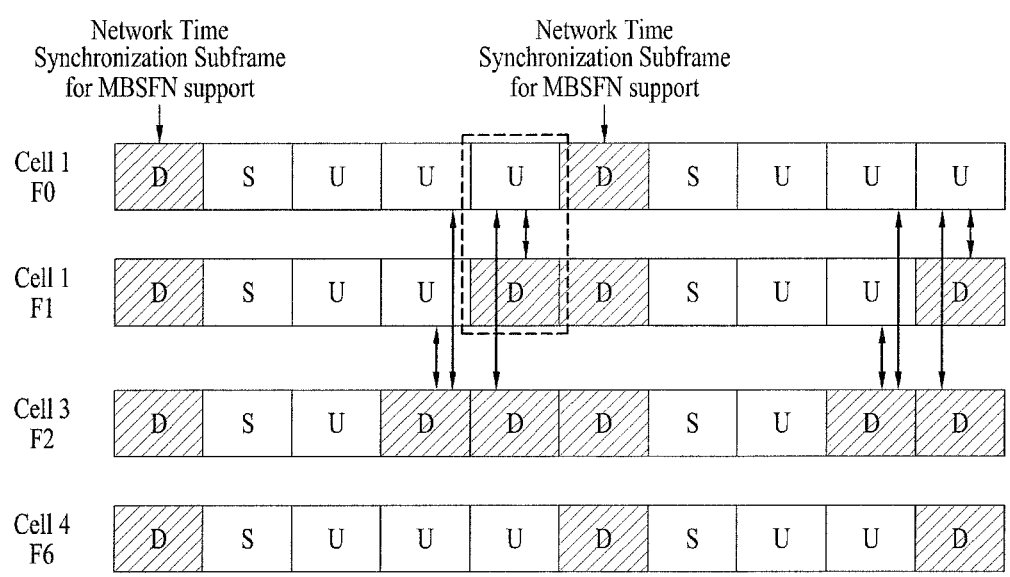
FIG. 8 is a diagram illustrating of a collision (or interference) model of a subframe level based on DL/UL configuration in the 3GPP LTE TDD shown in Table 2 in a D-TDD system.

FIG. 8 is a diagram illustrating of a collision (or interference) model of a subframe level based on DL/UL configuration in the 3GPP LTE TDD shown in Table 2 above in a D-TDD system.

Referring to FIG. 8, it is assumed that respective BSs (or cells) have different DL/UL configurations. FIG. 8 illustrates an example in which a BS 1 has DL/UL configuration 0 of Table 2, a BS 2 has DL/UL configuration 1, a BS 3 has DL/UL configuration 2, and a BS 4 has DL/UL configuration 6. However, embodiments of the present invention are not limited thereto. In FIG. 8, according to a model of highest interference, receiving performance of a UE of a cell in a downlink transmission section is reduced by uplink transmission power of the UE of the cell in an uplink transmission section. In addition, when two UEs of two cells are positioned at a cell boundary, higher interference may occur. In addition, the number of cells having the uplink transmission section among cells adjacent to a cell corresponding to the downlink transmission section may significantly affect the receiving performance.

In addition to interference factors that further occur, problems may arise in terms of coexistence with a heterogeneous TDD system may arise. For example, in case of allocation and use of neighbor frequency domains in IEEE 802.16 group TDD or TD-SCDMA (H/LCR-TDD), additional interference may occur due to DL/UL timing mismatch.

In addition, problems may arise in terms of downlink subframe timing synchronization for support of multi-media broadcast over a single frequency network (MBSFN). Thus, an approach to multicast channel (MCH) subframe allocation pattern (MSAP) is required.

Thus, the present invention proposes solutions for these problems.

First, a method for a neighbor cell as a downlink section in a cell as an uplink section is considered. As a method of removing interference for the neighbor cell as the downlink section in the cell as the uplink section, a method of reducing uplink transmission power for power control may be considered. According to the method, symbol level power control is applied during uplink transmission, and originally calculated total power is maintained.

In addition, a PSD level in which an entire symbol section is attenuated in a predetermined ratio may be applied. Transmission power [dBm/mW]=power calculated using power control [dBm/mW]−Offset[dB/mW], and an offset value may be signaled (for example, in a unicast message type) by a BS or may be applied to a preset level by a UE.

In addition, a method of limiting scheduling may be considered. For example, scheduling may be configured in such a way that uplink transmission in a cell 2 is not performed in the downlink section of a cell 1. User (users in a cell) selection may be performed based on SINR, geographic distribution from a BS in a cell, etc.

In order to overcome problems in terms of coexistence with TD-SCDMA and a heterogeneous TDD system of IEEE 802.16 group, as a method of adjusting a plurality of TDD DL/UL ratios (information to be indicated to a heterogeneous system), network statistics may be used.

Hereinafter, dynamic-TDD (D-TDD) for support of CA will be described.

A BS-specific component carrier (CC) between BSs may be configured. A method in which neighbor BSs use CC for D-TDD while avoiding each other based on a BS-specific CC index (or a UE-specific CC index) may be considered. That is, the D-TDD may be used in different BS-specific CC indexes or UE-specific CC indexes.

For example, a BS using two or more CCs may use some of CCs for D-TDD and may not use other CCs for D-TDD in consideration of a relationship with neighbor BSs. In addition, in the method, the BS may use a CC configured not to use D-TDD and use a TDD configuration set that exerts minimum interference on TDD configuration of neighbor BSs. As the number of available CCs is increased, interference due to use of D-TDD may be reduced. A deactivated CC among configured CCs may be applied in consideration of the above features.

<Coordinated DL/UL Configuration Allocation>

A collision cell coordination method for reducing interference influence will now be described. The collision cell coordination method limits the number of cells as an uplink section adjacent to cells as a downlink section or limits the number of cells as a downlink transmission section adjacent to cells as an uplink section. In this case, whether D-TDD support of a neighbor BS is activated may be shared to be pre-recognized and whether the collision cell coordination method is used may be determined. A BS may simultaneously transmit time delay information to a neighbor BS. Thus, the neighbor BS receiving the time delay information may perform D-TDD in a corresponding cell after the requested time delay duration.

For configuration of a DL/UL configuration set that exerts low interference influence, DL/UL configuration sets, the number of which corresponds to collision subframes, may be configured as shown in Table 7 below.

TABLE 7

| The number of collision subframe | Rel.8/9/10: TDD DL/UL configurations |
|---|---|
| 1 | (0, 6) (1, 6), (3, 4), (4, 5) |
| 1.5 | (2, 5) |
| 2 | (0, 1), (1, 2), (3, 5) |
| 2.5 | (1, 4), (2, 4), (3, 6) |
| 3.5 | (0, 3), (1, 3), (1, 5), (2, 3), (2, 6), (4, 6) |
| 4 | (0, 2) |
| 4.5 | (0, 4), (5, 6) |
| 5.5 | (0, 5) |

As shown in Table 7 above, collision subframes refer to subframes that exert interference influence by allocating different subframes (e.g., an uplink subframe, a downlink subframe, and a special subframe) to respective subframe indexes in a plurality of TDD DL/UL configurations. The number of collision subframes between cells may be from 1 to 5.5. When a combination of two DL/UL configurations is configured, the number of collision subframes may be minimized. When a combination of three or more DL/UL configurations is configured, the number of collision subframes may be increased. In Table 2 above, a case in which a special subframe S of a specific cell collides with an uplink subframe U or a downlink subframe D of another cell is denoted by 0.5. Likewise, a DL/UL configuration set that exerts low interference may be configured, and a method of adjusting the number of neighbor cells in order to reduce interference while using the DL/UL configuration set may be used. Combination configuration of DL/UL configurations of Table 7 may be set by a network node (for example, a BS). Then, the set DL/UL configuration information may be shared between a BS and neighbor BSs and may be signaled to a UE.

<Random Access (RA) Method for Reducing Interference>

When a physical random access channel (PRACH) preamble 4 that is mainly used in a small cell is used, a method using RA only in UpPTS of a first half-frame in a subframe set (except for sets (3,4) and (4,5)) combined with a subframe number (or an index) (3,4,5) may reduce RA performance attenuation. In Table 2 above, with regard to configurations 3, 4, and 5, a special subframe exists only in a second subframe in a first radio frame (10 ms), and thus, interference between BSs may be exerted from a downlink transmission section of configurations 3, 4, and 5 on UpPTS of a second special subframe that exists at a period of 5 ms, like DL/UL configurations 0, 1, 2, and 6.

Accordingly, when RA is performed by collision UpPTS, performance may be attenuated due to interference. In this case, a UE may further compensate an initial setting power level compared with a conventional power level and may perform transmission during RA transmission, thereby increasing probability of success of initial RA.

In addition, during transmission in a general uplink subframe transmission section using PRACH preamble formats 0 and 3 (formats used in TDD), a PRACH transmission section may be indicated to a UE such that a BS may not collide with a subframe of a cell as a downlink transmission section. In this case, the BS may inform the UE of the PRACH transmission section that does not collide with a downlink transmission section subframe of the BS in the index form as a downlink broadcast message type. Then, the UE may perform RA in the PRACH transmission section corresponding to a subframe index received from the BS.

<DL/UL Configuration Set (MBSFN Related D-TDD) Considering MBSFN Support>

Figure 9:
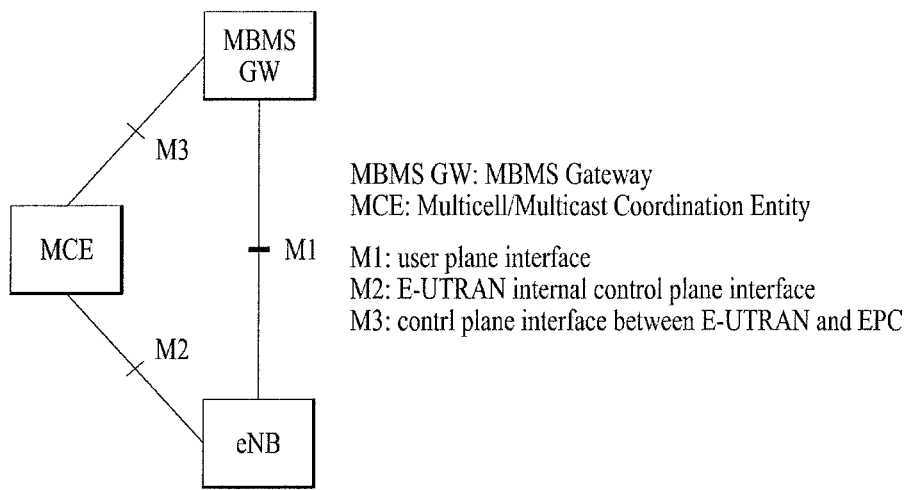
FIG. 9 is a diagram illustrating an example of a network structure for support of MBMS in a 3GPP LTE.

FIG. 9 is a diagram illustrating an example of a network structure for support of MBMS in a 3GPP LTE.

Referring to FIG. 9, the network may include a multi-cell/multicast coordination entity (MCE), an eNode, and a MBMS gateway (MBMS GW). The MCE and the eNode may be connected via an M2 interface as a control plane interface in E-UTRAN. The eNode and the MBMS GW are connected via an M1 interface. The MCE and the MBMS GW are connected via an M3 interface.

A MBSFN subframe corresponds to a subframe corresponding to subframe indexes 0, 1, 5, and 6 and a downlink subframe except for an uplink transmission subframe section. The eNode may transmit MBSFN data in the MBSFN subframe. Considering seven DL/UL configurations shown in Table 2 above defined in a current LTE/LTE-A system, when a DL/UL configuration 0 and a different DL/UL configuration are simultaneously used, MBSFN support is not possible. Thus, corresponding eNodes supporting MBSFN are required to include DL/UL configurations except for at least the configuration 0. A subframe 9 corresponding to a subframe index 9 is always a common section in the remaining DL/UL configurations except for the configuration 0. Based on this, the number of (common) SFN subframes may be combined using a conventional DL/UL configuration.

With regard to eNodes supporting SFN in eNodes supporting D-TDD, predetermined DL/UL configurations need to be limited in order to have at least one SFN subframes in TDD, as shown in Table 8 below.

TABLE 8

| Number | SFN support subframe index | DL/UL configurations set |
|---|---|---|
| 1 | #9 | (1, 6), (1, 3), (3, 6) |
| 2 | #4, #9 | (1, 2), (1, 4), (1, 5), |
|   | #8, #9 | (2, 3) |
| 4 | #3, #4, #8, #9 | (2, 5) |

As shown in Table 8 above, the "number" of Table 8 refers to the number of subframes as all downlink sections in a subframe except for a MBSFN subframe in two arbitrary DL/UL configurations shown in Table 2 above. When the number of subframes as all downlink sections is I in two DL/UL configurations and an SFN supporting subframe index is 9, a DL/UL configuration set may include (configuration 1, configuration 6), (configuration 1, configuration 3), and (configuration 6, configuration 6). In addition, when the number of subframes as all downlink sections in two DL/UL configurations is 2 and an SFN support subframe index is 4 and 9, a DL/UL configuration set may include (configuration 1, configuration 2), (configuration 1, configuration 4), and (configuration 1, configuration 5). When the number of subframes as all downlink sections in two DL/UL configurations is 2 and an SFN support subframe index is 8 and 9, a DL/UL configuration set may include (configuration 2, configuration 3).

In addition, the number of subframes as all downlink sections in two DL/UL configurations is 4 and an SFN support subframe index is 3, 4, 8, and 9, a DL/UL configurations set may include (configuration 2, configuration 5).

Information shown in Table 8 above may be configured by the MCE, may be transmitted to BSs, and may be shared by the BSs.

BSs need to previously share the information and to have the same configuration with regard to RLC/MAC/PHY layers. The information is required for configuration of MBMS subframe allocation pattern (MSAP). In a 3GPP LTE/LTE-A system, a MBMS coordination entity (MCE) may be signaled to a BS via the M2 interface. However, embodiments of the present invention preclude signaling via M1 and M3 interfaces. In case of LTE/LTE-A, configuration information shown in Table 8 above may be shared between BSs via an X2 interface. An X2 interface message may contain subframe index information corresponding to a common downlink transmission section.

As an example, when two types of DL/UL configurations are used, the MCE may configure a DL/UL configuration in consideration of the number of (common) SFN subframes and the number of subframes that simultaneously collide in downlink and uplink. This is shown in Table 9 below.

TABLE 9

| Number of collision subframes | Number of SFN subframes | DL/UL Configuration Set |
|---|---|---|
| 1 | 1 | (1, 6) |
| 1.5 | 4 | (2, 5) |
| 2 | 2 | (1, 2) |
| 2.5 | 1 | (3, 6) |
| 2.5 | 2 | (1, 4) |
| 3.5 | 1 | (1, 3) |
| 3.5 | 2 | (1, 5) |
| 3.5 | 2 | (2, 3) |

As shown in Table 9 above, collision subframes refer to subframes that exert interference influence by allocating different subframes (e.g., an uplink subframe, a downlink subframe, and a special subframe) to respective subframe indexes in a plurality of TDD DL/UL configurations. When the number of collision subframes of the DL/UL configuration sets shown in Table 2 is 1 and the number of SFN subframes is 1, a DL/UL configuration set may include (1,6). Here, (1, 6) refers to (DL/UL Configuration 1, DL/UL Configuration 6). In addition, when the number of collision subframes is 1.5 and the number of SFN subframes is 4, a DL/UL configuration set may include (2,5). When the number of collision subframes is 2 and the number of SFN subframes is 2, a DL/UL configuration set may include (1, 2).

When the number of collision subframes is 2.5 and the number of SFN subframes is 1, a DL/UL configuration set may include (3, 6). When the number of collision subframes is 2.5 and the number of SFN subframes is 2, a DL/UL configuration set may include (1, 4).

When the number of collision subframes is 3.5 and the number of SFN subframes is 1, a DL/UL configuration set may include (1, 3). When the number of collision subframes is 3.5 and the number of SFN subframes is 2, a DL/UL configuration set may include (1, 5). When the number of collision subframes is 3.5 and the number of SFN subframes is 2, a DL/UL configuration set may include (2, 3).

The MCE may share information of the DL/UL configuration sets configured like in Table 9 above with BSs, and the BSs may exchange the information via an X2 interface.

According to the aforementioned disclosure of the present invention, performance of an overall system is improved in consideration of various problems that may arise during D-TDD support in a conventional system. Through this specification, the embodiments of the present invention have been described in terms of 3GPPL LTE and LTE-A systems, however, the disclosure of the present invention may be applicable to other various communication systems.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

A method and apparatus for supporting dynamic-time division duplex (D-TDD) downlink-uplink configuration in a wireless communication system is industrially applicable to various communication systems such as systems of 3GPP LTE, LTE-A, IEEE 802, etc.

The invention claimed is:

1. A method of supporting a dynamic-time division duplex (D-TDD) downlink-uplink configuration by a base station in a wireless communication system, the method comprising:
receiving at least one TDD downlink-uplink configuration set from a network node,
wherein the at least one TDD downlink-uplink configuration set is configured by selecting a plurality of TDD downlink-uplink configurations according to a predetermined rule among a plurality of predefined TDD downlink-uplink configurations,
wherein the at least one TDD downlink-uplink configuration set comprises the plurality of TDD downlink-uplink configurations,
wherein, according to the predetermined rule, the at least one TDD downlink-uplink configuration set including the plurality of TDD downlink-uplink configurations is configured based on a number of subframes having a different subframe type per subframe index between the plurality of the TDD downlink-uplink configurations, and
wherein subframe types of the TDD downlink-uplink configurations comprise a downlink subframe type, an uplink subframe type, and a special subframe type; and
when a neighbor base station uses the D-TDD downlink-uplink configuration, using one of only the at least one TDD downlink-uplink configuration set of the predefined TDD downlink-uplink configurations.

2. The method according to claim 1, wherein the at least one TDD downlink-uplink configuration set is configured based on a number of a single frequency network (SFN) support subframe in a TDD downlink-uplink configuration.

3. A method of supporting a dynamic-time division duplex (D-TDD) downlink-uplink configuration by a first network node in a wireless communication system, the method comprising:
setting a TDD downlink-uplink configuration set by selecting two or more TDD downlink-uplink configurations according to a predetermined rule among a plurality of predefined TDD downlink-uplink configurations,
wherein, according to the predetermined rule, the two or more TDD downlink-uplink configurations are selected based on a number of subframes corresponding to all downlink sections from a single frequency network (SFN) support subframe index and remaining subframes except for a multicast-broadcast SFN (MBSFN) subframe.

4. The method according to claim 3, wherein the SFN subframe index comprises at least 3, 4, 8, or 9.

5. The method according to claim 3, wherein the number comprises at least 1, 2, or 4.

6. The method according to claim 3, further comprising transmitting information of the set TDD downlink-uplink configuration set to a second network node.

7. The method according to claim 6, wherein the first network node is a multi-cell/multicast coordination entity (MCE) and the second network node is a base station.

8. A first network node for supporting a dynamic-time division duplex (D-TDD) downlink-uplink configuration in a wireless communication system, the first network node comprising:
a processor configured to set a TDD downlink-uplink configuration set by selecting two or more TDD downlink-uplink configurations among a plurality of predefined TDD downlink-uplink configurations,
wherein the TDD downlink-uplink configuration set comprises two or more TDD downlink-uplink configurations set based on a number of subframes corresponding to all downlink sections from a single frequency network (SFN) support subframe index and remaining subframes except for a multicast-broadcast SFN (MBSFN) subframe.

9. The first network node according to claim 8, further comprising a transmitter configured to transmit information on the set TDD downlink-uplink configuration set to a second network node.

10. The first network node according to claim 9, wherein the information of the set TDD downlink-uplink configuration set is transmitted via an M2 interface.

11. The method according to claim 2, wherein the number of the SFN support subframe comprises 1, 2, or 4.

* * * * *